(12) United States Patent
Ukawa et al.

(10) Patent No.: US 7,884,787 B2
(45) Date of Patent: Feb. 8, 2011

(54) DISPLAY DEVICE AND PORTABLE INFORMATION DEVICE HAVING A MIRROR FUNCTION

(75) Inventors: Yusei Ukawa, Tokyo (JP); Toshiyuki Otsuki, Tokyo (JP)

(73) Assignee: TPO Hong Kong Holding Limited, Shatin (HK)

( * ) Notice: Subject to any disclaimer, the term of this patent is extended or adjusted under 35 U.S.C. 154(b) by 875 days.

(21) Appl. No.: 11/578,992

(22) PCT Filed: Apr. 27, 2005

(86) PCT No.: PCT/IB2005/051370

§ 371 (c)(1),
(2), (4) Date: Jul. 16, 2007

(87) PCT Pub. No.: WO2005/109086

PCT Pub. Date: Nov. 17, 2005

(65) Prior Publication Data

US 2008/0030644 A1 Feb. 7, 2008

(30) Foreign Application Priority Data

May 11, 2004 (JP) .............................. 2004-141320

(51) Int. Cl.
*G09G 3/34* (2006.01)

(52) U.S. Cl. .................. 345/84; 345/207; 345/690; 345/32; 345/50; 349/96; 349/113; 349/114; 455/566; 455/567

(58) Field of Classification Search .................. 345/32, 345/50–52, 207, 690, 211–214, 84; 349/96, 349/113, 114; 455/566, 567
See application file for complete search history.

(56) References Cited

U.S. PATENT DOCUMENTS

| | | | |
|---|---|---|---|
| 7,495,719 B2 * | 2/2009 | Adachi et al. | .................. 349/96 |
| 2004/0082367 A1 | 4/2004 | Nakanishi et al. | |
| 2004/0100598 A1 | 5/2004 | Adachi et al. | |
| 2004/0246407 A1 | 12/2004 | Tanaka et al. | |

FOREIGN PATENT DOCUMENTS

| | | |
|---|---|---|
| CN | 2326055 Y | 6/1999 |
| JP | 2004-69926 A | 4/2004 |
| JP | 2004-184491 A | 7/2004 |
| JP | 2004-212782 A | 7/2004 |
| WO | WO-95/27919 A1 | 10/1995 |
| WO | WO-02/069031 A1 | 9/2002 |
| WO | WO-03/034133 A1 | 4/2003 |

* cited by examiner

*Primary Examiner*—Henry N Tran
(74) *Attorney, Agent, or Firm*—Birch, Stewart, Kolasch & Birch, LLP

(57) ABSTRACT

The invention has an object of providing a display device which can make a full use of a mirror functionality even in a dark environment. A display device comprising: image forming means (50, 60, 70, 71) for displaying information to be displayed during one state external light during the other state; input means (30) for inputting a mirror function executing instruction; and control means (82) for causing the image forming means to be switched to the other state in response to the mirror-function executing instruction. The display device further comprises an illumination unit (91) for irradiating an object to be reflected in the mirror (60) with light during the other state.

15 Claims, 12 Drawing Sheets

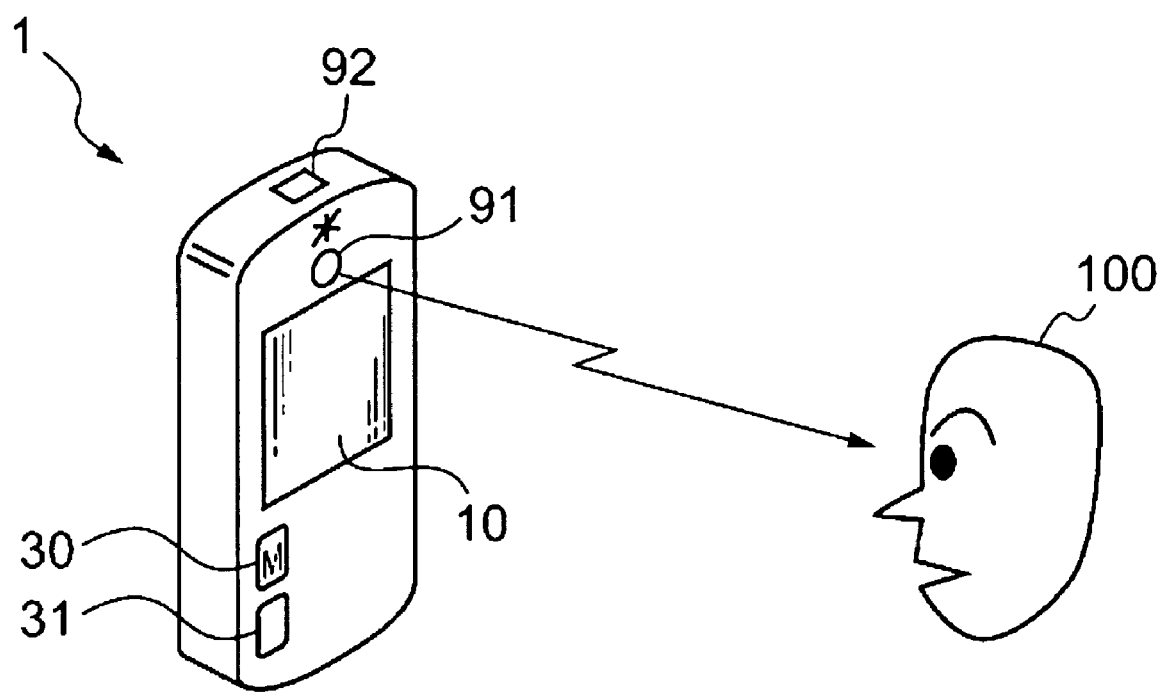
[Fig. 1]

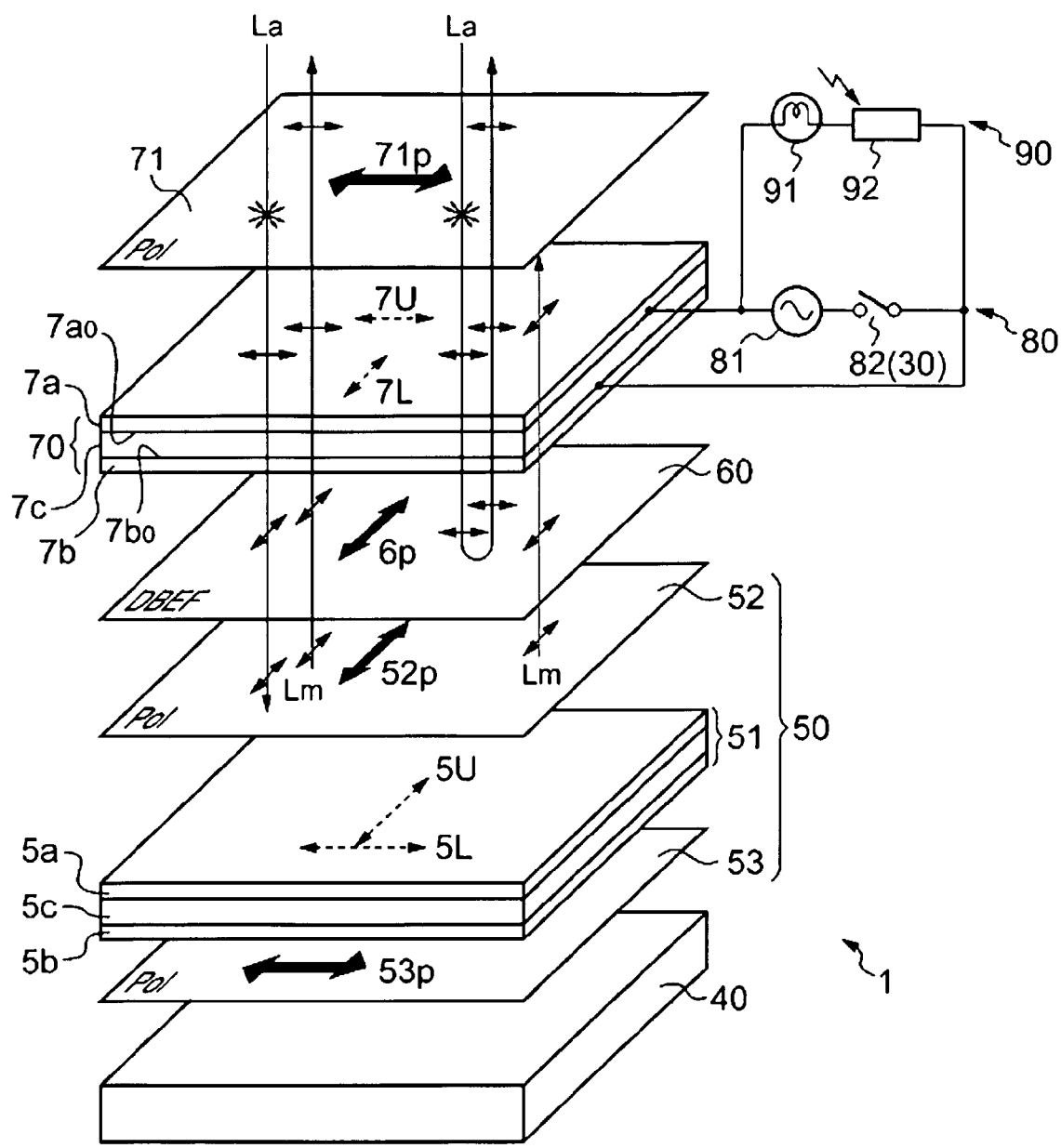
[Fig. 2]

[Fig. 3]
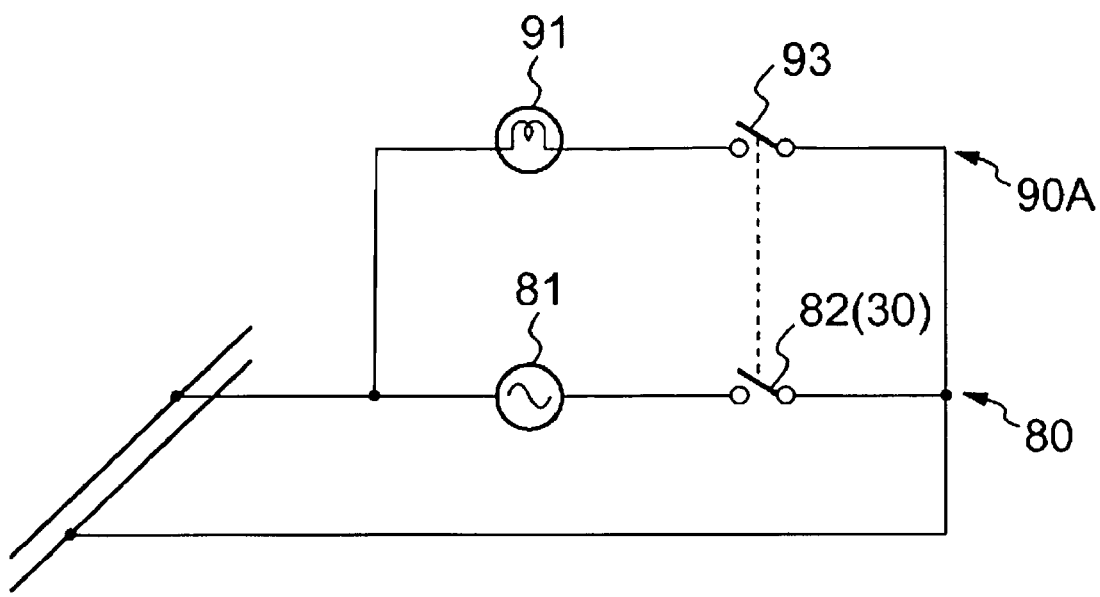
[Fig. 4]
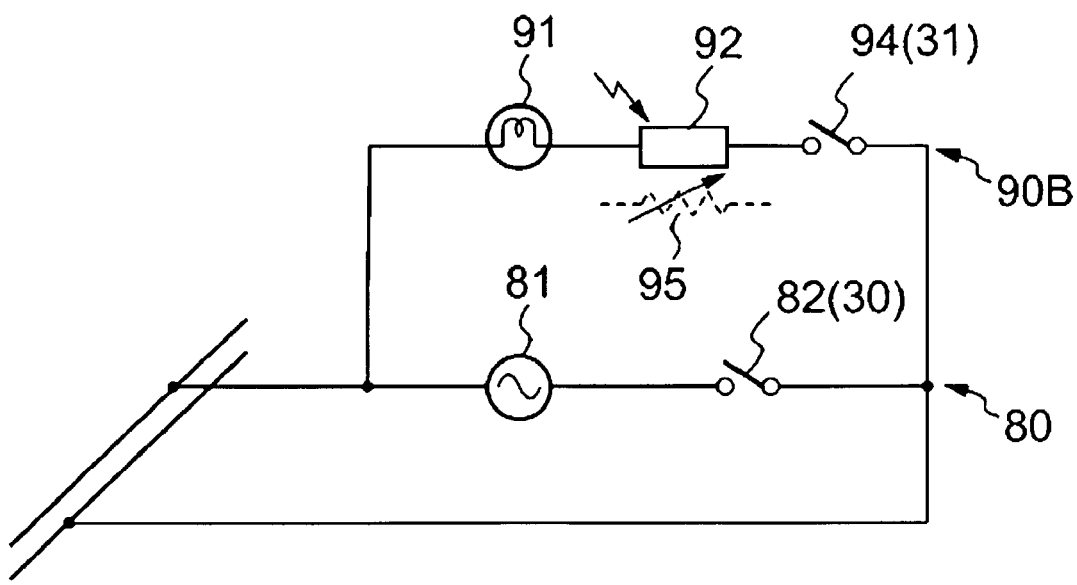

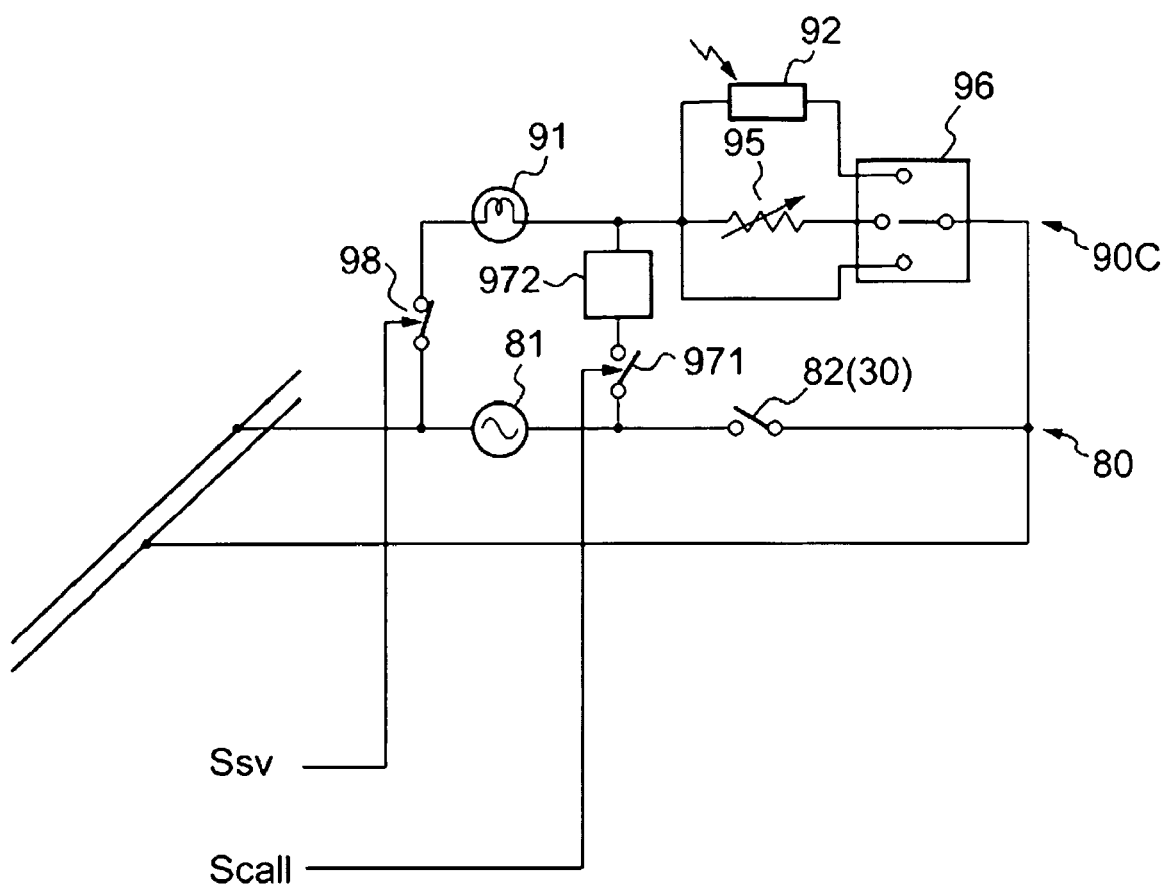
[Fig. 5]

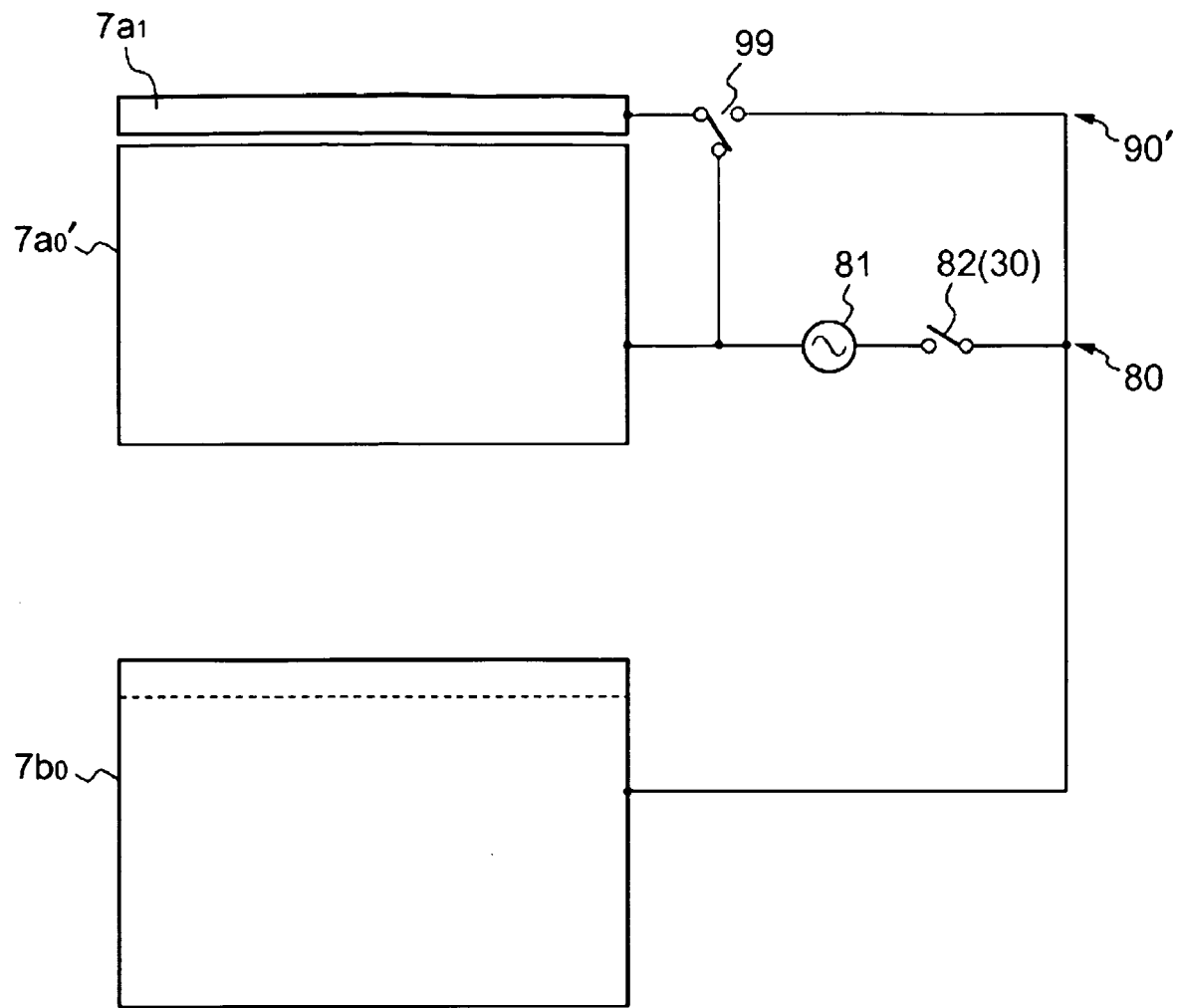
[Fig. 6]

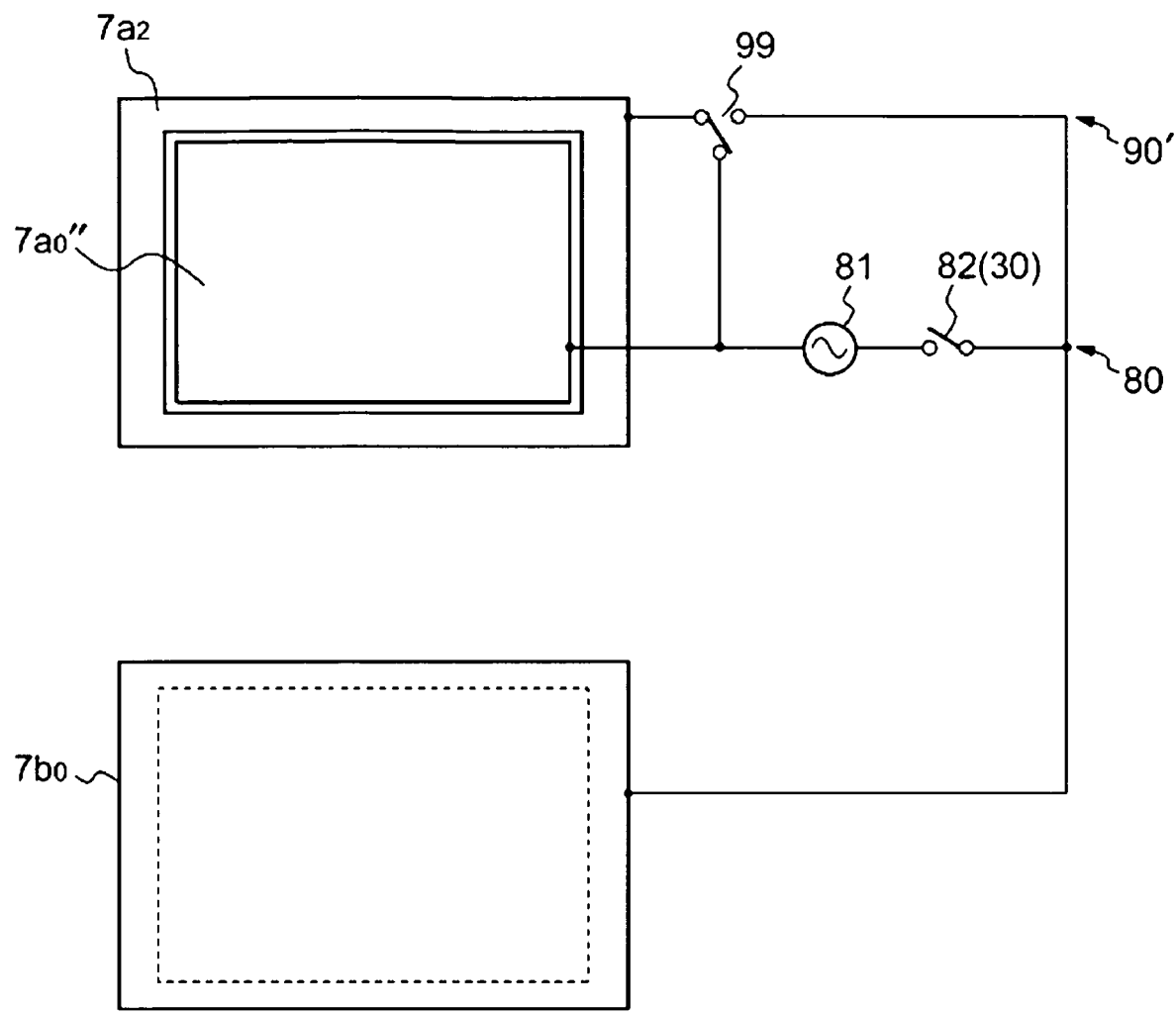
[Fig. 7]

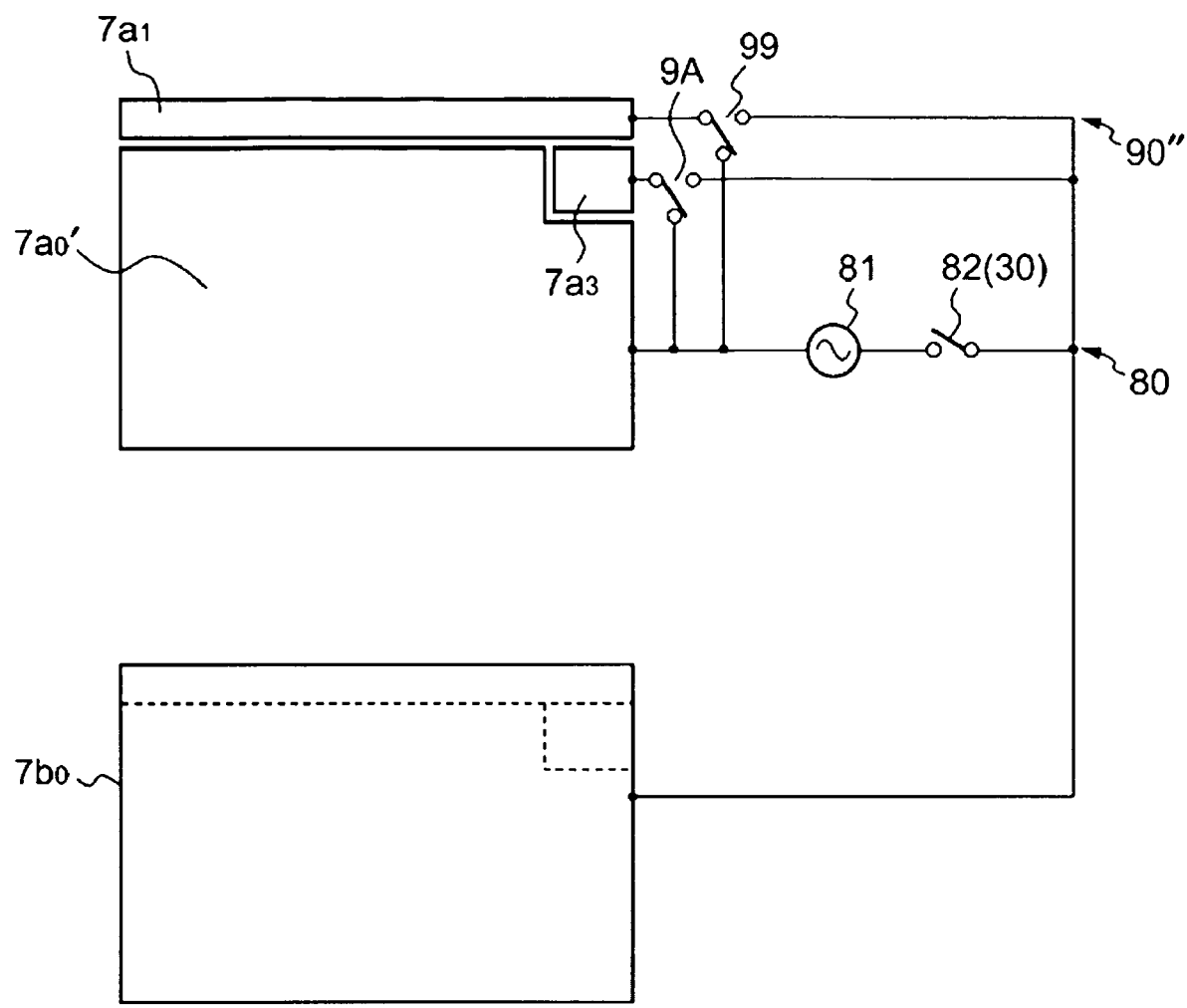
[Fig. 8]

[Fig. 9]
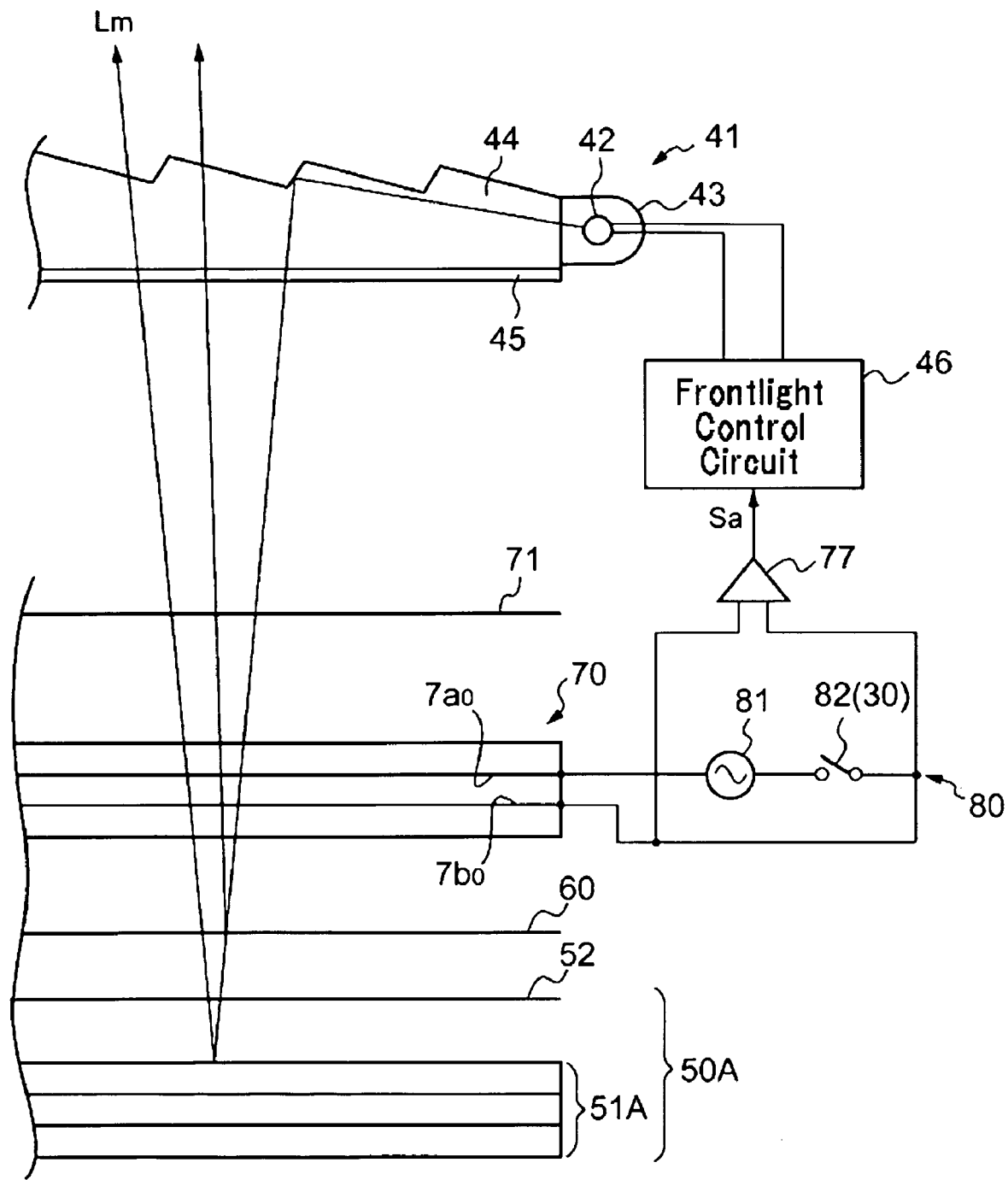

[Fig. 10]
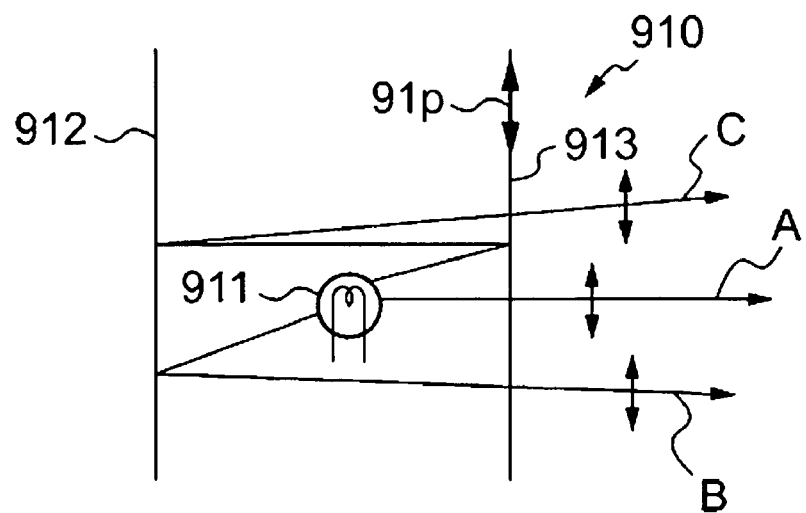
[Fig. 11]
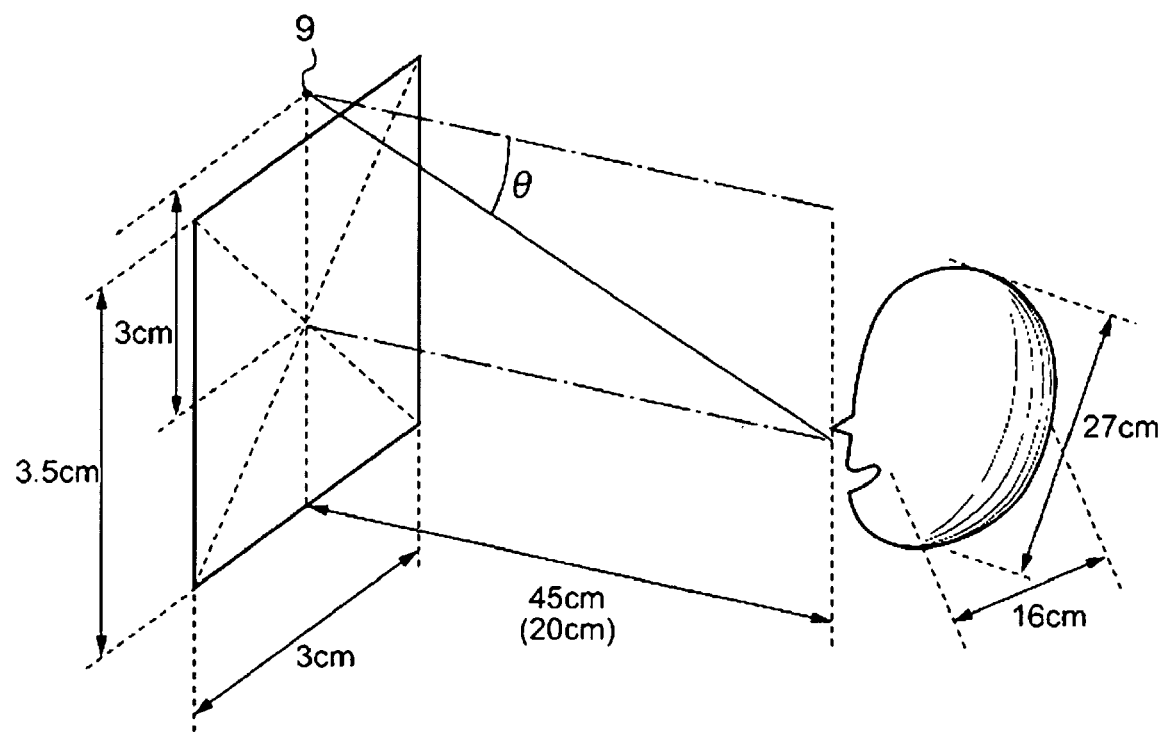

[Fig. 12]
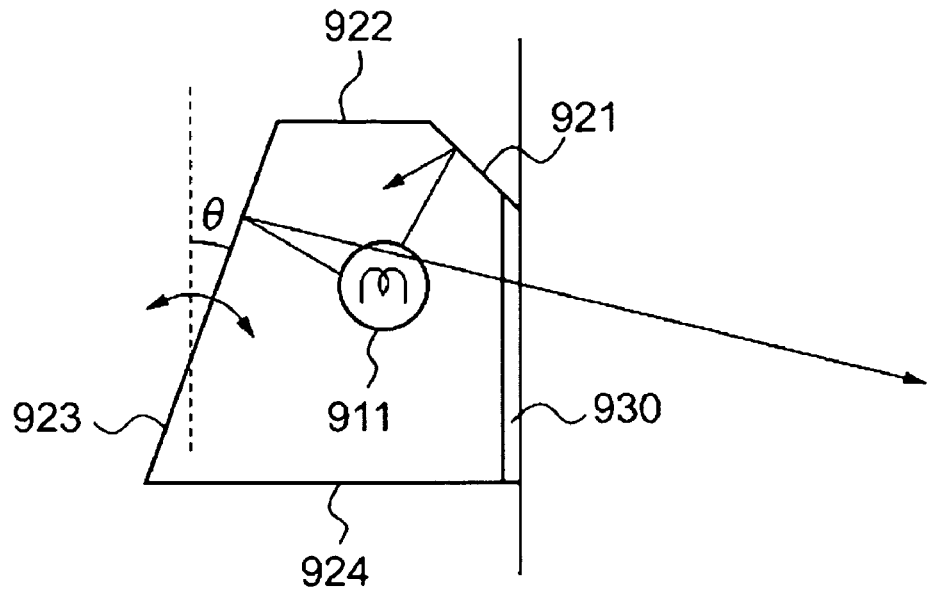
[Fig. 13]
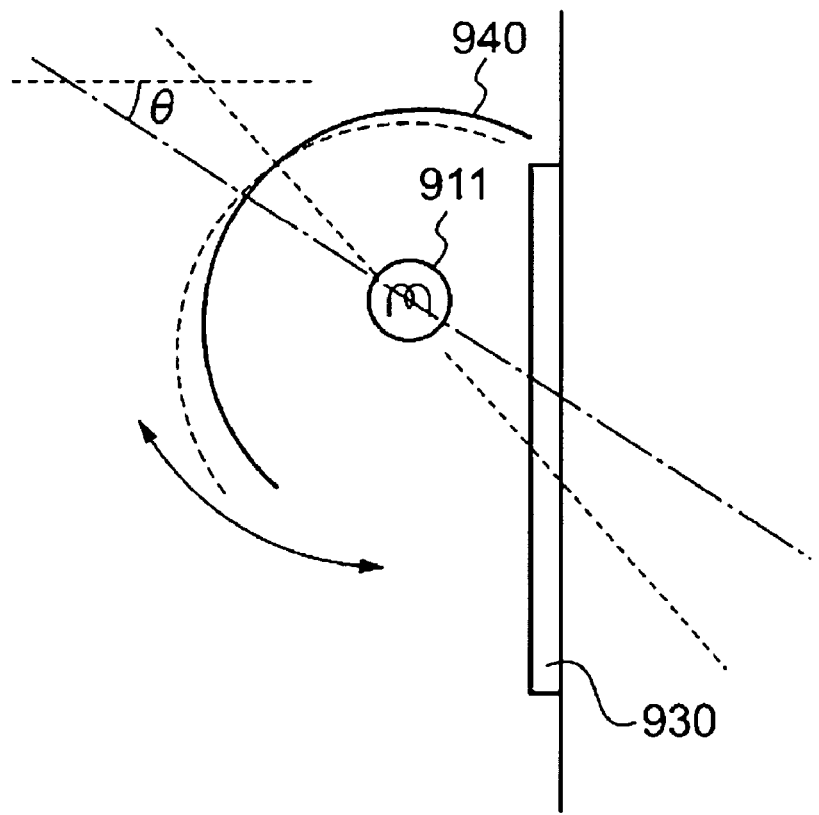

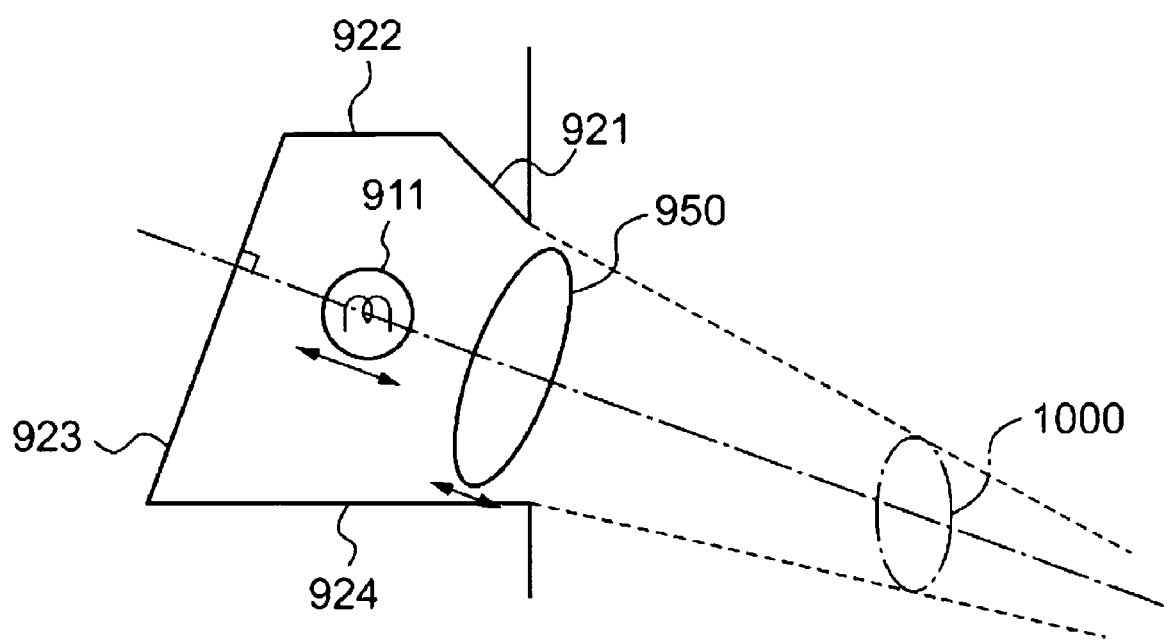
[Fig. 14]

[Fig. 15]
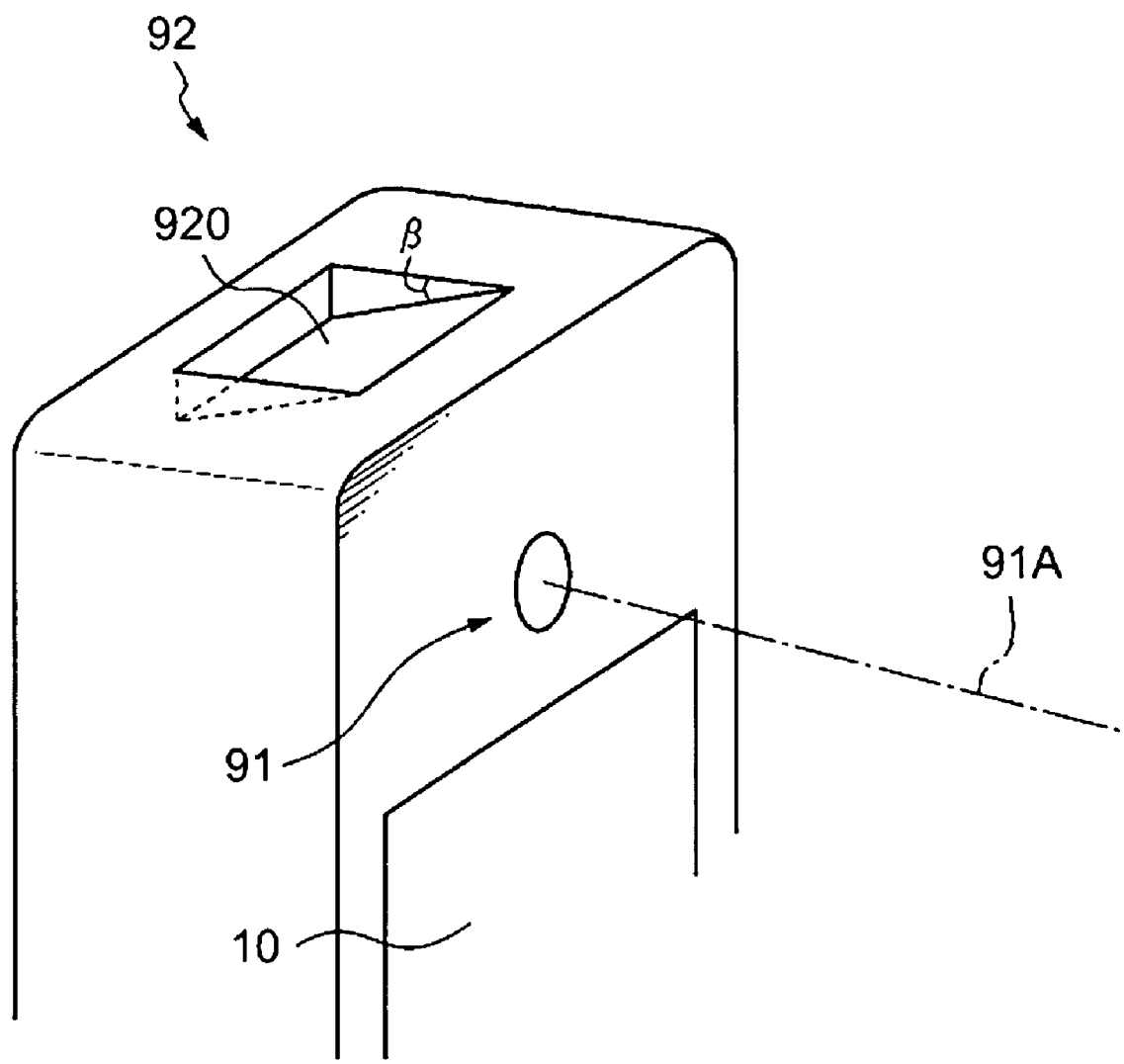

DISPLAY DEVICE AND PORTABLE INFORMATION DEVICE HAVING A MIRROR FUNCTION

TECHNICAL FIELD

The invention relates to a display device and a portable information device which have a mirror functionality. The invention particularly relates to a display device of type which has both a function of displaying images or other information to be displayed and a function of acting as a mirror reflecting an external object, and to a portable information device using such a display device.

BACKGROUND ART

This type of display device has already been put to practical use, and is described as a well-known technique in Patent Document 1, for example.

Patent Document 1 describes a device enabling switching between a state to display an image with high quality and a mirror state to obtain an eye-friendly reflected image suitable for a person to see a face and/or figure of the person to observe. The device is comprised of: an image display part that outputs image light; reflective type polarized light selecting means for transmitting therethrough a first linearly polarized light component outputted from the image display part and reflecting a second linearly polarized light component of which a polarizing axis is perpendicular to that of the first linearly polarized light component; a transmissive polarizing axis variable part capable of selecting whether or not to change a polarizing axis of incident linearly polarized light; and a polarized light selecting member which absorbs, among the incident light, the first linearly polarized light component, and transmitting therethrough the second linearly polarized light component with the polarizing axis perpendicular to that of the first linearly polarized light component, which are arranged in this order. The image display part is provided with absorbent type polarized light selecting means to output the first linearly polarized light as the image light.

Patent Document 1 provides such a configuration, and thus leads to mirror function architecture that adequately endures practical use.

[Patent Document 1] International Application Publication WO 02/069031A1 (particularly, see pages 6 to 7 and FIGS. 1 and 2)

DISCLOSURE OF INVENTION

Technical Problem

The present inventors recognized that the mirror functionality as described in Patent Document 1 will be of no use or makes an image reflected in the mirror hard to visually identify in a dark environment i.e. in darkness, even if the mirror functionality is superior. In particular, portable type electronic equipment is often used in such an environment and can not ignore it. In other words, the inventors noted that portable type equipments are naturally expected to be used in various environments, and if the mirror functionality is of no use under expected various circumstances, it has little value implementing the mirror functionality in the portable type equipments.

[Object]

The invention has been made in view of the foregoing recognition, and its object is to provide a display device which can make a full use of a mirror functionality even in a dark environment (measures against darkness).

The invention has another object of implementing measures against darkness suitable for a device capable of switching between information display and mirror action.

The invention has a further object of implementing measures against darkness suitable for a transmissive type and reflective type (including transflective type) liquid crystal display devices.

The invention has the other object of implementing measures against darkness suitable for portable information devices.

Technical Solution

In order to achieve the aforementioned objects, an aspect of the invention is a display device comprising: image forming means for displaying information to be displayed during one state and forming a mirror by reflecting external light during the other state; input means for inputting a mirror-function executing instruction; and control means for causing the image forming means to be switched to the other state in response to the mirror-function executing instruction, further comprising: an illumination unit for irradiating an object to be reflected in the mirror with light during the other state.

According to this aspect, it is possible to irradiate a user with light from the illumination unit when the user uses the mirror, and the user is thereby capable of using the mirror function with excellence even in a dark environment.

In this aspect, the control means may cause the illumination unit to be allowed to be turned on in response to the mirror-function executing instruction. In this way, the illumination unit becomes in an operable state when the device is used as a mirror, resulting in easier operability.

Further, the control means may cause the illumination unit to be turned on in response to the mirror-function executing instruction, or the control means may be responsive to the mirror-function executing instruction to cause the illumination unit to be driven at an illumination intensity according to external lightness information. The former has advantages that by turning the illumination unit on when the device is used as a mirror, notifying of a mode of the mirror action is achieved, as well as the measures against darkness. The latter has advantages that irradiation by the illumination unit at an intensity according to the degree of darkness leads to ease of use. As a made of combining these embodiments, the control means may be capable of beforehand selecting a submode in which the illumination unit should be made to be turned on in response to the mirror-function executing instruction or a submode in which the illumination unit should be made to be driven at an irradiation intensity according to external lightness information unit in response to the mirror-function executing instruction. It is thus possible to provide a form of usage more suitable for user preference. Alternatively, when a setting is established that the illumination unit should be off or when a setting is established that the illumination unit should be caused to make irradiation at a predetermined intensity, the control means may control the illumination unit in accordance with the setting. In this way, even when shifting to the mirror action mode, the setting can be fixed to either off of the illumination unit or irradiation at a predetermined intensity, and it is thus possible to support a wider variety of usage conditions.

In these embodiments, there may be provided a photodetector or input means for acquiring the external lightness information. It is noted that, the "external lightness information" includes equivalent information inputted by a user with his/her subjective judgment (or without it) (including information that is not response to the external lightness objectively), as well as the information according to the degree of darkness obtained from a detection output of the photodetector as the so-called photoelectric element.

As a form suitable for a transmissive type display device, the display device is a transmissive type display device having a backlight, where the illumination unit is constituted by the backlight. The backlight can thereby be used effectively. Further, light emitted by the backlight may be allowed to be transmitted to the outside through at least a part of an outer peripheral portion of a mirror-forming area of the image forming means during the other state. It is thus possible to use features of the backlight wherein surface-irradiating for the entire image-forming area without sacrificing propagation paths of the backlight light rays used in ordinary information display, resulting in a preferable form. As a preferred form for a reflective type display device, the display device is a reflective type display device having a frontlight, where the illumination unit is constituted by the frontlight, and light emitted by the frontlight is allowed to be applied to the object after being reflected on a mirror formed in the image forming means during the other state. The frontlight can thereby be used effectively. It is noted that there are two types as a transflective type display device, one using only the backlight, and the other using both the backlight and frontlight, so that a structure of the illumination unit may be determined according to an applied system.

According to another preferable form, power supplying of the illumination unit is forced to be off in a power saving mode. It is thus possible to contribute to reduction in power consumption of the device. This form is suitable particularly for portable devices forced to be driven within limited battery capacity.

Besides, the illumination unit may have an illumination directivity to direct light toward a predetermined use position on a substantially vertical line at a substantial center of a principal plane of a mirror formed in the mirror forming means, or the display device may have means for adjusting an illumination directivity and/or a spot shape of light rays of the illumination unit. The former is suitable for the case where a position of an object to be reflected in the mirror is determined to some extent. The latter is suitable for the case where such a position changes readily. The illumination unit may have a light source and at least one reflective plate reflecting the light emitted by the light source to direct the light toward the predetermined use position. Further, the illumination unit may have a light source and at least one optical refractor refracting the light emitted by the light source to direct the light toward the pre-determined use position. By this means, it is possible to set the directivity and/or a spot shape of the illumination unit relatively easily.

Moreover, the illumination unit may have a light source, a reflective type polarizing plate for transmitting a first polarized light component of the light emitted by the light source there through and reflecting a second polarized light component other than the first polarized light component and a reflective plate arranged opposed to the reflective type polarizing plate with the light source being between the reflective plate and the polarizing plate for reflecting the light from the light source and the second polarized light component, where the image forming means mainly reflect light of the first polarized light component on its mirror during the other state. It is thereby possible to make efficiency of the light reflected from the mirror, and so brighter images in the mirror can be obtained.

Another aspect of the invention aims a portable information device, which is configured using the display device of the aforementioned aspect or embodiment, whereby to provide a portable information device having advantages of the display device as described above and/or as described below can be provided. In particular, when the control means are responsive to an incoming call or specific state presented by the portable information device to perform illumination control of the illumination unit so as to give a notice of the call or specific state, it is possible to make the illumination unit more useful in the portable information device, which is a preferred manner.

DESCRIPTION OF DRAWINGS

FIG. 1 is a schematic diagram showing a concept and a form of usage of a mobile phone according to one embodiment of the invention;

FIG. 2 is a schematic view showing a characterizing configuration of a display device used in a mobile phone of FIG. 1;

FIG. 3 is a circuit diagram showing a modification of a control circuit applied to the display device of FIG. 2;

FIG. 4 is a circuit diagram showing another modification of a control circuit applied to the display device of FIG. 2;

FIG. 5 is a circuit diagram showing a further modification of a control circuit applied to the display device of FIG. 2;

FIG. 6 is an illustration showing one example of a modified illumination system applied to the display device of FIG. 2;

FIG. 7 is an illustration showing another example of a modified illumination system applied to the display device of FIG. 2;

FIG. 8 is an illustration showing a further example of a modified illumination system applied to the display device of FIG. 2;

FIG. 9 is a diagram showing an example in which the invention is applied to a reflective type display device;

FIG. 10 is a schematic illustration showing a modification of an illumination system according to the invention;

FIG. 11 is a schematic illustration showing relations between an image forming area and an object in the mobile phone of FIG. 1;

FIG. 12 is an illustration showing one structural example of an illumination unit suitable for the mobile phone of FIG. 1;

FIG. 13 is an illustration showing another structural example of an illumination unit suitable for the mobile phone of FIG. 1;

FIG. 14 is an illustration showing a further structural example of an illumination unit suitable for the mobile phone of FIG. 1; and FIG. 15 is a schematic view showing a constructional example of a photodetector suitable for the mobile phone of FIG. 1.

BEST MODE

The aforementioned aspects and other modes of the invention will be described in more detail below by way of embodiments with reference to accompanying drawings.

FIG. 1 shows a concept and a form of usage of a mobile phone as a portable information device according to one embodiment of the invention.

In this figure, a mobile phone 1 has a display screen 10 to define an area for performing information display and mirror formation, and as input means of a mirror-function executing instruction, a pressing key or button 30 for switching the screen from an information display mode to a mirror action mode (and vice versa). The phone 1 is further provided with an illumination unit 91 for irradiating a user 100 with light, and the unit 91 is controlled to enable such irradiation under various conditions described later during the mirror action mode. A photodetector 92 is further provided, for example, on a top portion of the phone body to detect darkness or lightness of an ambient environment of the mobile phone 1. Turning-on and/or emission intensity of the illumination unit 91 is controlled in accordance with a detection output of the photodetector 92. The photodetector 92 is preferably provided in such a position that the photodetecting surface is not hidden when a user handles the mobile phone 1. In this embodiment, since a device to which the invention is applied is a mobile phone and a user usually grasps the phone with one hand, the top portion or a bottom portion of the phone is preferably set as the position of the photodetector. While a single photodetector is described in the following explanations, the configuration may certainly be implemented using a plurality of photodetectors.

In such a configuration, when the user 100 uses the mobile phone 1 as a mirror, the button 30 is pressed as a mirror-function executing instruction. In response thereto, the screen 10 becomes in a mirror action mode, and for example, a face of the user 100 is reflected in the mirror formed in the area of the screen 10. At this point, the illumination unit 91 is controlled to be allowed to emit light in association with the button 30 being pressed, and the emission manner is determined by a detection output of the photodetector 92 and other settings. The light emitted from the illumination unit 91 illuminates the face of the user 100. Accordingly, the face of user 100 can be reflected in the mirror with high brightness even in darkness.

FIG. 2 shows a more specific configuration of the mobile phone 1 as one example.

The mobile phone 1 has a display device including a construction constituting the image forming means that is one of principal features of the invention. As shown in FIG. 2, the image forming means principally has a liquid crystal display panel 50, a reflective type polarized light selecting member 60, a transmission polarizing axis variable part 70, and a polarizing plate 71.

The liquid crystal display panel 50 mainly has a liquid crystal cell 51 having a liquid crystal layer 5*c* sandwiched between a pair of substrates 5*a* and 5*b* opposed to each other, and two polarizing plates 52 and 53 respectively arranged above and under the cell. The substrates 5*a* and 5*b* used herein have their respective alignment layers (not shown) whose surfaces coming into contact with the liquid crystal layer 5*c* are treated with orientation processing, and are further provided with various layers and structures (not shown) for applying voltages corresponding to images or other information to be displayed. The liquid crystal layer 5*c* is, for example, made of twist nematic type liquid crystal material, and oriented in such a manner that the (major axis) orientation directions of liquid crystal molecules being in contact with one and another (upper and lower) alignment layers are perpendicular to each other by virtue of the orientations of the alignment layers. Dotted arrows 5U and 5L show these orientation directions. Polarizing axes 52*p* and 53*p* of the polarizing plates 52 and 53 are respectively made parallel with the perpendicular orientation directions.

The reflective type polarized light selecting member 60 is one as described in an International Application Publication WO95/27919, and popularly called DBEF (Dual Brightness Enhancement Film). The DBEF 60 has a transmission (polarizing) axis 6*p* along one direction included in its principal plane, and has a function of reflecting polarized light components in directions other than the transmission axis direction. The DBEF 60 is arranged so that the transmission axis 6*p* is parallel to the polarizing axis 52*p* of the polarizing plate 52 on the upper side of the liquid crystal cell 51.

The transmission polarizing axis variable part 70 is comprised of a liquid crystal cell having a liquid crystal layer 7*c* of e.g. twist nematic type sandwiched between a pair of transparent substrates 7*a* and 7*b* opposed to each other. The liquid crystal layer 7*c* is provided with initial orientation on its lower side, which is parallel with the transmission axis 6*p* of the DBEF 60 and with initial orientation on its upper side, which is perpendicular to the axis 6*p*. Dotted arrows 7L and 7U show these orientation directions. In this embodiment, the liquid crystal cell of the transmission polarizing axis variable part 70 has transparent electrodes 7*ao* and 7*bo* respectively formed over the entire principal planes of the transparent substrates 7*a* and 7*b*. Applying either a low voltage or a high voltage to the liquid crystal layer 7*c* with the electrodes selectively provides a state of rotating the polarizing axis of light passed through the liquid layer 7*c* or another state of not rotating the a polarizing axis.

The polarizing plate 71 is arranged so that its polarizing axis 71*p* is parallel with the upper orientation direction 7U of the liquid crystal layer 7*c*.

A transmissive type display device is used in the mobile phone 1 of this embodiment, wherein a backlight 40 is provided on the back side of the image forming means as described above.

The mobile phone 1 is further configured to control switching of the image forming means between an image display mode and a mirror action mode. To this end, in this embodiment, a power supply circuit 80 comprised of an AC power supply 81 and a switch 82 in series is formed between one transparent electrode 7*ao* and the other transparent electrode 7*bo* in order to control a state of the transmission polarizing axis variable part 70. The switch 82 is linked to the button 30 shown in FIG. 1. When the button 30 is pressed during an off state of the switch 82 (information display mode), the switch 82 is switched on and keeps the on state. When the button 30 is pressed during an on state of the switch 82 (mirror action mode), the switch 82 is switched off and keeps the off state.

When the switch 82 is off, the circuit 80 is opened, and the voltage of the power supply 81 is not applied to the transparent electrodes 7*ao* and 7*bo*. Accordingly, the voltage is not applied to the liquid crystal layer 7*c*, the liquid crystal molecules maintain the twist orientation, and the polarizing axis of transmission light is rotated by 90° in the transmission polarizing axis variable part 70.

At this point, light Lm transmitted through the liquid crystal panel 50 is of a linearly polarized light component vibrating in a first direction parallel to the polarizing axis 52*p* of the polarizing plate 52 (hereinafter, referred to as a first polarized light component). After transmitting through the DBEF 60, the polarizing axis of the light Lm is rotated by 90° in the transmission polarizing axis variable part 70, and the light Lm is changed to a linearly polarized component vibrating in a second direction perpendicular to the first direction (hereinafter, referred to as a second polarized light component). The light Lm bearing the second polarized light component is passed through the polarizing plate 71 and guided to outside.

Light La from outside is non-polarized light, and when transmitted through the polarizing plate 71, it becomes the second polarized light component. Since the transmission polarizing axis variable part 70 rotates the polarizing axis of transmission light, the light La is changed to the first polarized light component. The light La bearing the first polarized light component is passed through the DBEF 60 and polarizing plate 52, and guided to the liquid crystal cell 51.

Meanwhile, when the switch 82 is on in the mirror action mode, the circuit 80 is closed, and the voltage of the power supply 81 is applied to the liquid crystal layer 7c by the transparent electrodes 7ao and 7bo. The voltage is thus applied to the liquid crystal layer 7c, the liquid crystal molecules stand upright against the substrates, and the polarizing axis of transmission light is not rotated in the transmission polarizing axis variable part 70.

At this point, the light Lm transmitted through the liquid crystal panel 50 is also of the first polarized light component, and maintains the first polarization state after transmitting through the DBEF 60 and the transmission polarizing axis variable part 70. By this means, when reaching the polarizing plate 71, the light Lm transmitted through the transmission polarizing axis variable part 70 is absorbed by the polarizing plate 71 that transmits only the second polarized light component therethrough but absorbs the other components, whereby it is not outputted to outside.

Meanwhile, the non-polarized light La from outside becomes the second polarized light component after transmitting through the polarizing plate 71, and maintains the second polarization state after transmitting through the transmission polarizing axis variable part 70. Accordingly, the light La reaches the DBEF 60 with being of the second polarized light component. Since the DBEF 60 transmits only the first polarized light component therethrough but reflects the other components, the light La in the second polarization state is reflected by the DBEF 60, and returned to the transmission polarizing axis variable part 70 again. The transmission polarizing axis variable part 70 transmits the reflected light with remaining the second polarization state therethrough, and the reflected light is transmitted through the polarizing plate 71 and guided to outside. In this way, the DBEF 60 subjects the external light La to mirror reflection, and thus provides the mirror action of reflecting an image of an object.

In FIG. 2, the behavior of the light Lm and La in the information display mode is shown on the left side, and that in the mirror action mode is shown on the right side.

It is noted that the intensity of the light Lm transmitted from the liquid crystal panel 50 to the front face side is dependent on the lightness of the information to be displayed on the liquid crystal panel 50. For example, when such information is the darkest, the intensity of the light Lm corresponding to the information is the minimum. Inversely, when such information is the brightest, the intensity of the light Lm corresponding to the information is the maximum. Accordingly, if the device is worked exclusively as a mirror in the mirror action mode, the liquid crystal panel 50 should be in the darkest state in order to prevent the light Lm from leaking to outside. Otherwise, the backlight 40 may be turned off so originally as not to generate the light Lm.

The mobile phone 1 according to this embodiment includes a structure forming the illumination unit 91 that is another one of the principal features of the invention and the control means for the unit 91. In this embodiment, the illumination unit 91 is an electronic part of type of emitting light by applying a voltage to its opposite ends based on a filament such as the so-called miniature bulb or based on an electroluminescence element such as LED. The unit 91 and the photodetector 92 are connected in series and constitute the illumination circuit 90. In this embodiment, the photodetector 92 is an electronic part of type based on a medium whose electric resistance varies in accordance with the amount of received light, but any other type of photodetector may be used, as long as it is capable of detecting ambient brightness. It is noted that in the case of using an LED, a DC driving circuit is provided for the LED. The main power supply provided in a mobile phone is mostly DC type, and actually, an AC output of the power supply 81 is obtained by a DC-AC conversion circuit for converting the DC voltage from the main power supply to AC.

As shown in FIG. 2, the illumination circuit 90 is parallel-connected with the liquid crystal layer 7c as a load of the power supply circuit 80. Accordingly, by on/off-controlling the switch 82, the power supply to the illumination circuit 90 is made or interrupted. This embodiment adopts a constitution where the power supply circuit 80 and the illumination circuit 90 serve as the control means for the illumination unit 91.

In the information display mode, i.e. when the switch 82 is off, the illumination circuit 90 is opened, the illumination unit 91 does not emit the light, and the user 100 is not irradiated with light. At this point, in the image forming means, information is displayed on the display panel 50, and the user 100 visually recognizes the information displayed as usual based on the light Lm that is modulated according to the information and transmitted to outside.

Meanwhile, in the mirror action mode, i.e. when the switch 82 is off, the illumination circuit 90 is closed, power is supplied to the illumination unit 91 via a resistance of the photodetector 92, and the illumination unit 91 emits light. The user 100 is thereby irradiated with light of intensity according to the resistance. At this point, the image forming means forms a mirror based on specular reflection of the DBEF 60, the light Lm that is information-modulated light is blocked not to transmit to outside, and the user 100 views the own figure reflected in the mirror (DBEF 60) while being irradiated with the light from the illumination unit 91.

The resistance of the photodetector 92 varies in accordance with the lightness of the environment of the mobile phone 1, and more specifically, becomes higher as the environment is lighter, while becoming lower as the environment is darker. Accordingly, as the environment of the mobile phone 1 is darker, higher power is supplied to the illumination unit 91. By this means, as the environment is darker, the illumination unit 91 emits brighter light to the user 100, and it is thus possible to expect satisfactory use of the mirror on all occasions.

FIG. 3 shows an example of an illumination circuit 90A provided with a switch 93 working in conjunction with the switch 82, substituting for the photodetector 92. According to this structure, when the switch 82 is turned on in the mirror action mode, the switch 93 is also invariably made closed and the power is supplied to the illumination unit 91 from the power supply 81. Accordingly, when using the mobile phone 1 as a mirror, the user 100 is always irradiated with certain light. Such emission of the illumination unit 91 may serve as a function of notifying the user that the mirror action mode is present.

In addition, in the structure shown in FIG. 3, the switch 93 may be omitted, where only the illumination unit 91 is parallel-connected with the series arrangement of the power supply 81 and switch 82.

FIG. 4 shows an example of an illumination circuit 90B further provided with a switch 94 connected in series with the photodetector 92. The switch 94 is linked to a pressing button 31 similar to the button 30 separately provided in the mobile phone 1 as shown in FIG. 1. When the switch 94 is off and the user presses the pressing button 31, the switch 94 is made closed. When the switch 94 is on and the user presses the pressing button 31, the switch 94 is made opened. According to this structure, when the switch 82 is turned on in the mirror action mode, a state is obtained for allowing the power to be supplied to the illumination circuit 90B, while a state of the switch 94 determines whether or not to supply the power to the illumination unit 91. The user 100 is thereby capable of beforehand setting whether or not to cause the illumination unit 91 to work in the mirror action mode, and only when setting is made to cause the unit 91 to work, light can be emitted in accordance with the lightness of the environment in the mirror action mode.

Such a beforehand working on/off setting for the illumination unit 91 is applicable to the structure as shown in FIG. 3, and for example, is implemented by connecting the switch 93 in series to the switch 94 linked to the button 31. The user 100 is thereby capable of beforehand setting whether or not to cause the illumination unit 91 to work in the mirror action mode, and only when setting is made to cause the unit 91 to work, light is forcibly emitted in the mirror action mode.

Further, as shown by a dotted line in FIG. 4, a variable resistor 95 may be provided instead of the photodetector 92. In this case, for example, the variable resistor 95 can vary the electrical resistance value from substantially zero to the maximum value, and is allowed to set the resistance value by hardware and/or software, not shown, in the mobile phone 1. In this way, the user 100 is capable of setting the emission intensity of the illumination unit 91 according to the ambient darkness determined by the user 100 or to preference of the user 100. In another respect, there is provided a feature to enable setting of a resistance value of the variable resistor 95 in accordance with detection information from a different type photodetector instead of the photoresistor 92 of the resistance-variable type.

FIG. 5 shows a structural example where control of the illumination unit 91 is further sophisticated.

In FIG. 5, an illumination circuit 90C has a switch 96 with one input and three outputs for selecting an illumination style of the illumination unit 91 in the mirror action mode. The input is connected to one end of the power supply circuit 80, and the outputs are connected respectively to direct connection lines of the photodetector 92, variable resistor 95 and illumination unit 91. It is thus possible to support a variety of features to determine the emission intensity of the illumination unit 91 as described above. In other words, when the switch 82 is turned on in the mirror action mode, supply of the power to the illumination circuit 90C is allowed, and so a state of the switch 96 can determine a state of power supply to the illumination unit 91. By controlling the electrical connection relationship between the input and outputs of the switch 96, it is possible to select either; supplying power to the illumination unit 91 according to the external lightness detected by the photodetector 92 or according to resistance setting of the variable resistor 95, or in a fixed level (herein, the maximum power of the power supply 81); or not supplying any power to the illumination unit 91. The user 100 is thus capable of determining how to use the illumination unit 91 in the mirror action mode according to preference of the user 100.

The illumination circuit 90C in FIG. 5 further performs a control suitable for the mobile phone 1. To this end, a series connection circuit of an on/off switch 971 and a flickering circuit 972 is connected between one electrode side of the power supply 81 and one electrode side of the illumination unit 91. The switch 971 is controlled to be on or off in accordance with a call signal Scall obtained from a receiving circuit, not shown, in the mobile phone 1, and it is normally made opened, and when it is made on, relays the power to the flickering circuit 972 from the power supply 81, instead of supply of the power via the switch 96. Based on this power supply, the flickering circuit 972 operates to cause intermittent power supply to the illumination unit 91. The call signal Scall becomes effective in response to an occurrence of a call (including an e-mail arrival) detected by the receiving circuit, is used in other controls, processings and the like in the mobile phone 1, and may not be generated particularly for the illumination circuit 90C.

According to such a structure, the illumination unit 91 emits light flickeringly in response to a call irrespective of states of the switches 82 and 96. Accordingly, when a call occurs at the time the mobile phone 1 is used as a mirror, the user 100 can be notified of the call by flickering operation of the illumination unit 91.

Although, the illumination unit 91 is used to notify a call in response to an occurrence thereof in this example, it may be used to notify occurrences of various states in adaptation to applied device. Such states include specific states such as alarm and time signal. In order to address various states, it is preferable to prepare various notification forms corresponding to the states. To this end, for example, this can be implemented by providing a plurality of kinds of intermittent operations of power supply to the illumination unit performed by the flickering circuit 972, and performing different types of intermittent operations corresponding to the specific states.

Further, the illumination circuit 90C of this example supports the so-called power saving mode. To this end, an on/off switch 98 is disposed between the other electrode side of the power supply 81 and the other electrode side of the illumination unit 91. The switch 98 is normally made closed, controlled to be on or off according to a power saving instruction signal Ssv obtained from a control circuit, not shown, in the mobile phone 1, and when off, it interrupts the power supply from the power supply 81. The power saving instruction signal Ssv becomes effective by the control circuit basically when the charged energy of a system battery power supply of the mobile phone 1 falls below a predetermined reference, is used in other control, processing and the like in the mobile phone 1, and may not be generated specially for the illumination circuit 90C.

According to such a structure, the illumination unit 91 is forcibly prohibited from emitting the light when the mobile phone 1 needs power saving, irrespective of states of the switches 82, 96 and 971. Therefore, the user 100 is not irradiated during power saving even when the mode is switched to the mirror action mode. It is thus possible to give the first priority to long use of the charged energy of the battery power supply.

FIG. 6 shows a characteristic structure of the transmission polarizing axis variable part 70 modified by another embodiment of the invention, where the same parts as described above are assigned the same reference numerals. Further, for simplicity in descriptions, only characteristic elements of the transmission polarizing axis variable part 70 are decomposed, extracted and shown as a plan view.

In FIG. 6, the lower transparent electrode 7bo of the transmission polarizing axis variable part 70 is formed to extend over the entire surface of the substrate 7b as in the above-mentioned embodiment. Meanwhile, the modified upper transparent electrode 7ao is divided into two areas. One of the areas occupies the most part of the display area as a first electrode part 7ao' to perform image display and mirror formation. The other one of the areas occupies a longitudinal area extending transversely above/next to the first electrode part in the display area, and is formed as a second electrode part 7a1 to mainly perform backlight transmission and mirror formation.

In response thereto, the power supply circuit 80 and an illumination circuit 90' are configured as follows. The first electrode part 7ao' is connected to one end of the power supply 81 as in the above-mentioned embodiment. The second electrode part 7a1 is connected to a non-selected terminal of a selecting switch 99. First and second selected terminals of the switch 99 are respectively connected to one end of the power supply 81 and a common connection point of the lower electrode 7bo and the switch 82.

According to such a structure, when the switch 82 is off in the information display mode, since a high voltage is applied to neither the first electrode part 7ao' nor the second electrode part 7a1, the liquid crystal layer 7c of the transmission polarizing axis variable part 70 maintains twist orientation of the liquid crystal molecules over the entire area, and rotates the polarizing axis of the transmission light by 90°. Accordingly, the whole of the display area provides the behavior of the light La and Lm as shown on the left side in FIG. 2 to display information.

Meanwhile, when the switch 82 is on in the mirror action mode, the high voltage is applied to the first electrode part 7ao', the liquid crystal layer 7c causes the liquid crystal molecules to stand upright on the principal plane of the substrate in the area of the first electrode part 7ao', and does not rotate the polarizing axis of the transmission light. By this means, the area of the first electrode part 7ao', i.e. the most part of the display area provides the behavior of the light La and Lm as shown on the right side in FIG. 2 to exhibit the mirror action.

At this point, a selection state of the switch 99 determines whether or not to supply the high voltage to the second electrode part 7a1. In other words, when the switch 99 is controlled to select the first selected terminal, the power from the power supply 81 is supplied to the second electrode part 7a1 via the switch. Then, as in the area of the first electrode part 7ao', the mirror action is exhibited in the area of the second electrode part 7a1. In contrast thereto, when the switch 99 is controlled to select the second selected terminal, the second electrode part 7a1 is made at the same potential as in the lower electrode part 7bo via the switch. In this case, since the liquid crystal layer 7c rotates the polarizing axis of transmission light in the area of the second electrode part 7a1, the light Lm from the panel 50 is allowed to transmit through the area of the second electrode part 7a1. In this Lm transmittable state, the display panel 50 displays a well-lighted state, i.e. a modulation state with the highest brightness, e.g. white in the area corresponding to the second electrode part 7a1. The light from the backlight 40 is thus guided to outside through the area of the second electrode part 7a1. This light substitutes for the illumination light of the illumination unit 91 as described above. In this example, it is possible to emit the light from the longitudinal area corresponding to the second electrode part 7a1 disposed on the upper side of the display area as shown in FIG. 6, and the user 100 is irradiated with the light applied from just above the mirror reflecting the face of the user.

By thus modifying the transmission polarizing axis variable part 70 and adapting a display driving state of the display panel 50 to the part 70, it is possible to effectively use the backlight 40 as illumination means in the mirror function, without particularly providing the illumination unit 91.

The structure as shown in FIG. 6 can be modified as shown in FIG. 7. In FIG. 7, the upper transparent electrode 7ao is divided into two areas similarly, but the first electrode part 7ao'' is reduced in size over the whole with geometrical similarity of plane shape of the display area, and the second electrode part 7a2 is formed to surround the first electrode part 7ao''.

It is thereby possible to emit the light from the outer peripheral area of the display area. In this case, the user 100 is irradiated with the light from the outer circumstance of the mirror reflecting his/her face, and accordingly, the light is emitted as if a face (object) to be reflected is spatially enveloped from the front.

FIG. 8 shows another modified example, where the upper transparent electrode 7ao of the transmission polarizing axis variable part 70 is divided into three areas. The divisional areas include the first electrode part 7ao' that occupies the most part of the display area and that works for image display and mirror formation, the second electrode part 7a1 that occupies a longitudinal area extending transversely above/next to the first part and that mainly works for backlight transmission and mirror formation, and a third electrode part 7a3 that is formed near the edge, in an upper right corner in this example, of the first electrode part 7ao' and that mainly works for image display and information display in the mirror action mode.

An illumination circuit 90'' coping with to the above structure is provided with the structure of the illumination circuit 90' and further with a switch 9A for the third electrode part 7a3. The switch 9A is connected at its non-selected terminal to the third electrode part 7a3, while being connected at its selected terminals respectively to one end of the power supply 81, and the common connection point of the lower electrode 7bo and the switch 82.

According to such a structure, when the switch 82 is on in the mirror action mode, a selection state of the switch 9A determines whether or not to supply the high voltage to the third electrode part 7a3. In other words, when the switch 9A is controlled to select the first selected terminal, the power of the power supply 81 is supplied to the third electrode part 7a3 via the switch. Then, as in the area of the first electrode part 7ao', the mirror action is exhibited in the area of the third electrode part 7a3. In contrast thereto, when the switch 9A is controlled to select the second selected terminal, the third electrode part 7a3 is made at the same potential as at the lower electrode 7bo via the switch, and the light Lm from the panel 50 is allowed to transmit through the area of the third electrode part 7a3. In this Lm transmittable state, the display panel 50 is allowed to display in the area corresponding to the third electrode part 7a3, for example, "Mirror Mode" with white in black background. By such display, the user 100 can confirm that the mobile phone 1 operates as a mirror currently.

It is noted that, it is not necessary to always provide an independent area such as the third electrode part 7a3 for display in the mirror action. For example, in the structure as shown in FIG. 6 or 7, it is possible to display "Mirror Mode" with white in black background as described above in part of the area of the second electrode part 7a1 or 7a2 when the area of the second electrode part 7a1 or 7a2 is in the Lm transmittable state, respectively.

Further, in structures based on the backlight as shown in FIGS. 6 to 8, the illumination on/off control and the illumination intensity control as described earlier is not described for simplicity, but it is apparent that the features according to such control can be applied to the structures based on the backlight. In this case, the control can be carried out by local gray scale control of the display panel 50. More specifically, the control is implemented by controlling display of the display panel 50 to any level in a range of the darkest state to the brightest state when necessary in the area for use in illumination such as area of the second electrode parts 7a1, 7a2, by controlling an area ratio of an area of a predetermined gray scale state, for example, the darkest state (or the brightest state) to the entire area of the part 7a1, 7a2, or by combining them.

Furthermore, the structures as shown in FIGS. 6 to 8 adopt a form where an area of illumination used in the mirror action mode is fixed to a single area, but a plurality of areas may be provided for illumination. In this case, it is also possible to achieve the illumination on/off control and the illumination intensity control by selectively on/off-controlling the plurality of illumination areas. This selective control may be combined with the local gray scale control as described above.

The area for illumination may be in the shape of other polygon or round, and is not limited to the shapes as shown in FIGS. 6 to 8. Therefore, when a circular illumination area is formed above the display area, it is possible to implement the form similar to the illumination unit 91 as described earlier.

Moreover, the structures as shown in FIGS. 6 to 8 show the example where the illumination area is formed by dividing the upper transparent electrode. To form the illumination area, however, it is naturally possible to divide the lower transparent electrode, or divide both the upper and lower electrodes.

FIG. 9 shows a configuration of a further embodiment, which is applied to a reflective type display device having a frontlight.

In FIG. 9, an applied liquid crystal display panel 50A has a liquid crystal cell 51A having inside a reflective structure to reflect external light or light from the frontlight. The liquid crystal cell 51A is also configured to guide the light Lm according to an image to outside in displaying the image.

As in the well-known structure, a frontlight 41 is comprised of a light source 42 provided on the end side of the principal plane, a reflective plate 43, a light guide plate 44 having an end plane opposed to the reflective plate 43, and an antireflective layer 45 formed on the surface of the light guide plate 44, opposed to the panel 50A. The light source 42 is supplied with power by a frontlight control circuit 46.

In this embodiment, as means for sensing the power-on from the power supply circuit 80, a voltage sensing circuit 77 is provided having two input terminals respectively connected to the first transparent electrode 7ao and the second transparent electrode 7bo. Based on potentials of the first and second transparent electrodes 7ao and 7bo, the voltage sensing circuit 77 senses a value of generated voltage between the electrodes, and outputs a sensing signal Sa becoming effective when the sensed voltage is higher than a predetermined reference voltage. The sensing signal Sa is supplied to the frontlight control circuit 46.

In response to the sensing signal Sa, the frontlight control circuit 46 controls light emission of the frontlight 41. When the sensing signal Sa is effective, the control circuit 46 controls the light emission of the frontlight 42 in a predetermined manner as described above.

When the switch 82 is off in the information display mode, the frontlight control circuit 46 supplies the power to the light source 42 to generate, as ordinarily in the display device, the light for information display passing the same path as in the external light. The light thus generated from the frontlight 41 is directed toward the liquid crystal panel 50A by the light guide plate 44, transmitted through the polarizing plate 71, the transmission polarizing axis variable part 70, the DBEF 60 and the polarizing plate 52, reflected by an internal reflective structure of the liquid crystal cell 51A, and guided to outside. When it is determined that lighting of the frontlight is not necessary by the user or a system controller of the mobile phone, the frontlight control circuit 46 does not turn on the light source 42, and inputs only the external light to the liquid crystal panel 50A.

When the switch 82 is on in the mirror action mode, the sensing circuit 77 issues the sensing signal Sa, and in response thereto, the frontlight control circuit 46 supplies the power to the light source 42. The light thus generated from the frontlight 41 is reflected by the DBEF 60 and guided to outside, because the transmission polarizing axis variable part 70 is driven corresponding to the mirror action. The user 100 is thereby irradiated with the light guided to outside, and as in the illumination unit and the backlight as described above, the measures against darkness is taken in the mirror action mode.

In addition, in this embodiment it is possible to adopt the illumination on/off control and the illumination intensity control as described earlier.

Basic configurations to implement the invention using the illumination unit (including structures with the backlight and frontlight) have been described in the foregoing. The design is also important to appropriately illuminate a face of the user 100 with light as shown in FIG. 1.

FIG. 10 shows an improved example of the illumination unit. In this figure, an illumination unit 910 has a light source 911, a diffusing reflective plate 912 disposed at the back side of the source 911, and a DBEF 913 disposed at the front side of the source 911. The light emitted from the light source 911 generally takes a first path (A) where the light is directly passed through the DBEF 913 and guided to outside, a second path (B) where the light is diffused and reflected once by the reflective plate 912, passed through the DBEF 913 and guided to outside, and a third path (C) where the light is once reflected by the DBEF 913, further diffused and reflected by the reflective plate 912, passed through the DBEF 913, and guided to outside.

Since the DBEF 913 transmits therethrough a polarized light component vibrating in the direction parallel to the transmission axis 91p and reflects components except such a component, the light along the path (A) is part of the initially generated light. However, the light reflected by the DBEF 913 can be converted into light having the polarizing axis in a direction parallel to the transmission axis 91p by the diffusing reflective plate 912 due to diffusion therein, and can be transmitted through the transmission axis 91p when returned to the DBEF 913. Accordingly, the DBEF 913 outputs only the polarized light vibrating in the direction parallel to the transmission axis 91p.

The transmission axis 91p of the DBEF 913 is aligned with the direction perpendicular to the transmission axis 6p of the DBEF 60 (see FIG. 1) in the image forming means. Such axis alignment exhibits finally the effect of providing an image reflected in the DBEF 60 with more brightness in the mirror action mode.

The light subjected to specular reflection in the DBEF 60 in the mirror action mode is of the second polarized light component vibrating in the direction perpendicular to the transmission axis 6p of the DBEF 60, and therefore, a larger amount of the second polarized light component as the light incident on the DBEF 60 from an object makes an image reflected in the mirror brighter. To this end, as shown in FIG. 10, the illumination unit 910 beforehand generates the light corresponding to the second polarized light component vibrating in the direction (the direction of the transmission axis 91p) perpendicular to the transmission axis 6p, and irradiates the face of the user 100 as an object with such light, whereby the second polarized light component incident on the DBEF 60 from the face of the user 100 is increased, and it is possible to make the image reflected in the mirror bright.

FIG. 11 shows positional relationships between the illumination unit 9 used in the invention and an object. When using the mirror to reflect the own face, the user 100 generally directs the face right toward the front of the mirror. Meanwhile, the illumination unit 9 is arranged in the edge portion or outside of the area serving as a mirror. Therefore, it is preferable that the light emitted from the illumination unit 9 has an angle (θ) as shown in the figure to be directed toward a position of the face expected at the time of use.

For example, when the mirror area has a size of 3.5 cm×3 cm, in order to reflect all the female face of average size, for example, 27 cm×16 cm in the mirror, the best distance is about 45 cm from the center on the normal set on the center of the mirror area, and when the illumination unit 9 is provided above the external edge of the mirror area and spaced 3 cm apart from the center, it is preferable that θ is about 4° (θ=4°). Further, the distance suitable for women's make up in this example is about 20 cm from the center on the normal, and it is confirmed that the angle θ is preferably about 9° (θ=9°). Accordingly, it is preferable that θ is approximately in a range from 4° to 9°. Further, the light emitted from the illumination unit 9 preferably has a spot shape with the same size as that of the object in a position of the targeted object.

From such a viewpoint, it is possible to determine the irradiation directivity and spot shape (size) of the illumination unit 9 to be adapted to an applied device. On the other hand, when the directivity and spot shape are made variable with reference to the directivity and spot shape determined, for example, as described above, it is possible to cover various objects and users.

FIG. 12 shows an example of an illumination unit to implement the aforementioned directivity, and the unit is principally comprised of a light source 911 and four reflective plates 921 to 924 surrounding the source 911. A transparent plate 930 is provided on a face from which the light is actually outputted from the illumination unit, and the surface of the transparent plate is made parallel to the principal plane of the mirror forming area in the applied device.

The first feature in this structure is the reflective plate 921 disposed at an angle with respect to the transparent plate 930 side. The reflective plate 921 reflects inward the upward light emitted from the light source 911. By this means, it is possible to eliminate the upward light becoming unnecessary in the form of usage as shown in FIG. 11, while making downward light useful in this form by reflecting the light inward to be changed in the direction by other reflective plates. The second feature is making a reflective area of the reflective plate 923 disposed at the right back of the light source 911 relatively large, and setting the inclined angle of the plate 923 at a value of θ with respect to the principal plane of the mirror forming area (the dotted line shows the direction of the principal plane). By such reflective plate 923, it is possible to efficiently direct the light emitted from the light source 911 toward a position of a targeted object.

It is preferable making the reflective plate 923 movable and moving the plate 923 with reference to the angle θ, and it is thereby possible to adjust the directivity of the emitted light with ease.

FIG. 13 shows an example of using a parabolic reflective plate 940. In this example, the axis of the reflective plate 940 is beforehand inclined so that the light is directed toward an object. The degree of inclination is set so that a value of the angle θ is set to an angle defined by the irradiation center axis (shown by alternate long and short dashed line) of the light and the normal direction of the principal plane of the mirror forming area. It is thereby possible to adapt the irradiation directivity of the illumination unit to the object efficiently.

Further, the directivity can be adjusted by rotating the reflective plate 940 about a predetermined rotation axis, e.g. the light source 911 as a center as shown by the arrow in FIG. 13. It is thus possible to change the irradiation center axis of the emitted light.

In order to provide the illumination light with a desired spot shape, a structure as shown in FIG. 14 is available where a convex lens 950 as an optical refractive member is arranged in the front of the light source 911, and an object is irradiated with the light via the lens 950. An object 1000 can thereby be irradiated with gathered light.

In such a structure, by making the lens 950 and/or the light source 911 movable and varying a relative distance between the lens 950 and the light source 911, it is possible to change a spot size in the object 1000 to a desired one.

FIG. 14 is based on the structure in FIG. 12, but such a convex lens may be applied to the structure as shown in FIG. 13. Accordingly, both the irradiation directivity and irradiation spot shape of the illumination unit can be made the most suitable for the form of usage as shown in FIG. 11. Thus adapting the irradiation characteristics to the form of usage is extremely effective particularly in the case where a user uses the device in a limited way as in portable equipment.

In addition, it is naturally possible to combine the structure as shown in FIGS. 12 to 14 and the structure as shown in FIG. 10. According to such a combination, the structure forming the mirror (mirror forming means) is also optimized, resulting in irradiation of bright and suitable light.

As one preferred example of constituting the photodetector 92, there is a form as shown in FIG. 15. In this form, an actual light receiving surface 920 is inclined, the photodetector 92 being provided on the top portion of the mobile phone, to prevent the light emitted from the illumination unit 91 from being reflected by an object and other reflective members and entering the light receiving surface 920. Herein, the light receiving surface 920 is formed to swerve off the irradiation axis 91A of the illumination unit 91 from the illumination unit 91 by an angle β. It is thereby possible to prevent the light from the illumination unit 91 from being detected by the photodetector 92 to enable the photodetector 92 to accurately detect the external lightness. Other various methods are considered as means for preventing the light from the illumination unit 91 from entering the photodetector 92, but this means can be implemented readily by thus providing the light receiving surface 920 with an angle with respect to the irradiation axis.

As is apparent from the foregoing, the invention is not limited to the image forming means as shown in FIG. 2. For example, the invention can be applied to a structure having the mirror function of various forms as described in Patent Document 1, and further applicable to any other display devices with the mirror function.

Further, the aforementioned embodiments describe the transmissive type and reflective type liquid crystal display devices, but are applicable to the so-called transflective type display device and further to display devices other than the liquid crystal type.

The representative embodiments of the invention are described above, and it would be possible to found out various modifications within the scope of claims attached herewith to those skilled in the art.

LIST OF REFERENCE NUMERALS

1 . . . mobile phone
10 . . . faceplate
100 . . . user
30 . . . mirror-mode switching button
31 . . . illumination control setting button 40 . . . backlight
50, 50A . . . liquid crystal display panel
51, 51A . . . liquid crystal cell
52, 53 . . . polarizing plate
60 . . . DBEF
70 . . . transmission polarizing axis variable part
7a, 7b . . . transparent substrate
7c . . . liquid crystal layer
7ao, 7bo . . . transparent electrode
71 . . . polarizing plate
80 . . . power supply circuit
81 . . . power supply
82 . . . mirror effect working switch
90, 90A, 90B, 90C', 90', 90" . . . illumination circuit
9, 91 . . . illumination unit
91A . . . illumination axis
92 . . . photodetector
920 . . . light receiving surface
93 . . . cooperative working switch
94 . . . setting switch
95 . . . variable resistor
96 . . . selecting switch
971 . . . on-off switch
972 . . . flickering circuit
98 . . . on-off switch
99 . . . selecting switch
7ao', 7ao" . . . first electrode part
7a1, 7a2 . . . second electrode part
7a3 . . . third electrode part
41 . . . frontlight
42 . . . light source
43 . . . reflective plate
44 . . . light guide plate
45 . . . antireflective layer
46 . . . frontlight control circuit
77 . . . voltage sensing circuit
910 . . . illumination unit
911 . . . light source
912 . . . diffusing reflective plate
913 . . . DBEF
921-924 . . . reflective plate
930 . . . transparent plate
940 . . . parabolic reflective plate
950 . . . convex lens
1000 . . . object

The invention claimed is:

1. A display device comprising: image forming means for displaying information to be displayed during one state and forming a mirror by reflecting external light during the other state; input means for inputting a minor-function executing instruction; and control means for causing the image forming means to be switched to the other state in response to the mirror-function executing instruction, further comprising:
an illumination unit for irradiating an object to be reflected in the minor with light during the other state,
wherein the control means cause the illumination unit to be allowed to be turned on in response to the mirror-function executing instruction, and the control means are responsive to the minor-function executing instruction to cause the illumination unit to be driven at an illumination intensity according to external lightness information.

2. A display device as defined in claim 1, wherein the control means cause the illumination unit to be turned on in response to the mirror-function executing instruction.

3. A display device as defined in claim 1, wherein the control means are capable of beforehand selecting a submode in which the illumination unit should be made to be turned on in response to the mirror-function executing instruction or a submode in which the illumination unit should be made to be driven at an irradiation intensity according to external lightness information unit in response to the mirror-function executing instruction.

4. A display device as defined in claim 1, wherein when a setting is established that the illumination unit should be off or when a setting is established that the illumination unit should be caused to make irradiation at a predetermined intensity, the control means control the illumination unit in accordance with the setting.

5. A display device as defined in claim 1, comprising a photodetector or input means for acquiring the external lightness information.

6. A display device as defined in claim 1, the device being a transmissive type display device having a backlight, wherein the illumination unit is constituted by the backlight.

7. A display device as defined in claim 6, wherein light emitted by the backlight is allowed to be transmitted to the outside through at least a part of an outer peripheral portion of a mirror-forming area of the image forming means during the other state.

8. A display device as defined in claim 1, the device being a reflective type display device having a frontlight, wherein the illumination unit is constituted by the frontlight, and light emitted by the frontlight is allowed to be applied to the object after being reflected on a mirror formed in the image forming means during the other state.

9. A display device as defined in claim 1, wherein power supplying of the illumination unit is forced to be off in a power saving mode.

10. A display device as defined in claim 1, wherein the illumination unit has an illumination directivity to direct light toward a predetermined use position on a substantially vertical line at a substantial center of a principal plane of a mirror formed in the mirror forming means.

11. A display device as defined in claim 10, wherein the illumination unit comprises a light source and at least one reflective plate reflecting the light emitted by the light source to direct the light toward the predetermined use position.

12. A display device as defined in claim 10, wherein the illumination unit comprises a light source and at least one optical refractor refracting the light emitted by the light source to direct the light toward the predetermined use position.

13. A display device as defined in claim 1, further comprising means for adjusting an illumination directivity and/or a spot shape of light rays of the illumination unit.

14. A display device as defined in claim 1, wherein the illumination unit comprises a light source, a reflective type polarizing plate for transmitting a first polarized light component of the light emitted by the light source therethough and reflecting a second polarized light component other than the first polarized light component, and a reflective plate arranged opposed to the reflective type polarizing plate with the light source being between the reflective plate and the polarizing plate for reflecting the light from the source and the second polarized light component, and wherein the image forming means mainly reflect light of the first polarized light component on its mirror during the other state.

15. A portable information device comprising a display device as defined in claim 1, wherein the control means are responsive to an incoming call or specific state presented by the portable information device to perform illumination control of the illumination unit so as to give a notice of the call or specific state.

* * * * *